United States Patent

Higashida et al.

[11] Patent Number: 5,961,898
[45] Date of Patent: Oct. 5, 1999

[54] MOLDING APPARATUS AND MOLDING METHOD FOR LIGHT-PERMEABLE ARTICLES

[75] Inventors: Takaaki Higashida, Kadoma; Shinji Kadoriku, Takarazuka; Tokiharu Nakagawa, Hirakata; Akinobu Katayama, Katano; Hiroshi Yutani, Katano; Yoshio Maruyama, Kyoto, all of Japan

[73] Assignee: Matsushita Electric Industrial Co., Ltd., Kadoma, Japan

[21] Appl. No.: 08/942,902

[22] Filed: Oct. 2, 1997

[30] Foreign Application Priority Data

Oct. 3, 1996 [JP] Japan .................................. 8-262856

[51] Int. Cl.[6] .................................................. B29C 45/24
[52] U.S. Cl. ...................... 264/39; 264/328.1; 425/210; 425/225; 425/546
[58] Field of Search .......................... 264/39, 102, 328.1; 425/210, 225, 542, 546

[56] References Cited

U.S. PATENT DOCUMENTS

| | | |
|---|---|---|
| 4,820,467 | 4/1989 | Ehrler et al. ............................. 264/161 |
| 4,921,416 | 5/1990 | Green ........................................ 425/542 |
| 5,174,932 | 12/1992 | Johnson et al. ........................... 264/39 |
| 5,217,661 | 6/1993 | Noguchi et al. .......................... 264/39 |
| 5,454,991 | 10/1995 | Brew ......................................... 264/39 |
| 5,478,227 | 12/1995 | Kuse ......................................... 264/39 |
| 5,542,835 | 8/1996 | Kennedy et al. ..................... 264/328.1 |

*Primary Examiner*—Jill L. Heitbrink
*Attorney, Agent, or Firm*—Wenderoth, Lind & Ponack, L.L.P.

[57] ABSTRACT

A molding apparatus for light-permeable articles which includes a nozzle that is movable up and down. A suction path and a suction device connected to the suction path are provided so as to suck a gas at a contact face of a sprue bush and its vicinity during the up/down movement of the nozzle. Accordingly, foreign substances, invading the mold can be sucked up before the apparatus performs a molding operation. Therefore, foreign substances are prevented from being mixed into the molded product. The molded product is accordingly improved in quality and yield.

20 Claims, 8 Drawing Sheets

MOLDING APPARATUS AND MOLDING METHOD FOR LIGHT-PERMEABLE ARTICLES

BACKGROUND OF THE INVENTION

1. Field of the Invention

The present invention relates to an apparatus and a method for molding light-permeable articles such as CDs (compact discs), LDs (laser discs), etc.

2. Description of the Related Art

Conventionally, a molding apparatus 1 constructed as shown in FIG. 12 has been used to mold products, for example, CDs, LDs and the like with the use of light-permeable resin materials. The illustrated molding apparatus 1 is a vertical type wherein a nozzle 2 for injection of the resin materials is moved up and down in a direction of gravity. A space 6 is secured between a mold, for example metal mold 4 fitted to a fixed plate 3 and a metal mold 5 mounted to a movable plate to mold the product. The fixed plate 3 has a recessed part 3a. A sprue bush 10 with a recessed part 11 is set in the metal mold 4 at a bottom part of the recessed part 3a. A cylinder 8, equipped with the nozzle 2 at a front end thereof, moves up and down in the recessed parts 3a and 11. In order to inject the plasticized molten resin into the space 6 in the thus-constituted molding apparatus 1, the cylinder 8 descends, allowing the nozzle 2 at the front end part of the cylinder 8 to contact against a bottom part 13 of the sprue bush 10. The plasticized molten resin in the cylinder 8 is sent out by a plunger (or a screw) and injected into the space 6 through a sprue part 12 within the sprue bush 10. After the injection of the resin, the movable plate is driven to open the molds and at the same time, air is sprayed to the molded body from a path 5a formed in the metal mold 5 so as to release the molded body from the metal mold 5. When the metal molds are completely opened, the sprue part of the sprue bush 10 and the molded body are ejected. Simultaneously with this, air is sprayed into the molded body from the paths 5a, thereby releasing the molded body from the metal mold 5. Upon completion of the releasing operation, the molded body is transferred to outside of the apparatus by a take-out device.

In the meantime, the nozzle 2 is kept at high temperatures so that the resin material is emitted in a melted state, and therefore the resin material adhering to a front end part 2a of the nozzle 2 is easily carbonized in the emission or the following purge operation. The carbonized resin material adhering to the front end part 2a is sometimes detached from the front end part because of the vibration of the nozzle 2 subsequent to the up/down movement of the cylinder 8 and drops onto the bottom part 13 of the sprue bush 10. In the event that this kind of foreign substance including dust invades the space 6 through the sprue part 12 of the sprue bush 10, the molded product fails in quality. In other words, when the molded body is used as a CD or the like and if the foreign substance of a size exceeding, e.g., 80 $\mu$m is mixed in the molded body, the foreign substance may invite irregular reflection of light or the like and thereby cause trouble with respect to the reading/writing of information. The mixing of the foreign substance into the molded body leads eventually to a great problem of decreasing a manufacturing yield.

SUMMARY OF THE INVENTION

The object of the present invention is therefore to provide an apparatus and a method which improve quality and the yield of products, i.e., high-quality molded products at low cost.

In order to achieve the aforementioned objective, a molding apparatus according to one aspect of the present invention comprises a nozzle movable up and down in a direction of gravity for injecting a resin material for forming a molded body at a space in a mold. A sprue bush having a sprue part contacts a front end part of the nozzle when the nozzle descends and which guides the resin material injected from the nozzle to the space. A foreign substance can possibly invades the space via the sprue part when the nozzle and the sprue bush are not in touch with each other. The sprue bush further comprising a suction part for sucking a gas and the foreign substance at least at a contact face, of the sprue bush which contacts the nozzle.

In a molding method according to a second aspect of the present invention, when used in a molding apparatus which comprises a nozzle movable up and down in a direction of the gravity for injecting a resin material for forming a molded body at a space in a mold and a sprue bush having a sprue part which a front end part of the nozzle contacts when the nozzle descends and which guides the resin material injected from the nozzle to the space, with a possibility that a foreign substance invades the space via the sprue part when the nozzle and the sprue bush are not in touch with each other; the molding method comprising coming into contact with the nozzle and the sprue bush so that an injection hole opened at the front end part of the nozzle communicates with the sprue part of the sprue bush; injecting the resin material from the nozzle to the mold thereby forming a molded body; and taking out the molded body from the mold. The method further comprising sucking a gas and the foreign substance at least at a contact face of the sprue bush, which contacts the nozzle at least while the nozzle is descending.

BRIEF DESCRIPTION OF THE DRAWINGS

These and other objects and features of the present invention will become clear from the following description taken in conjunction with the preferred embodiments thereof with reference to the accompanying drawings in which.

DETAILED DESCRIPTION OF THE PREFERRED EMBODIMENTS

Figure 1:
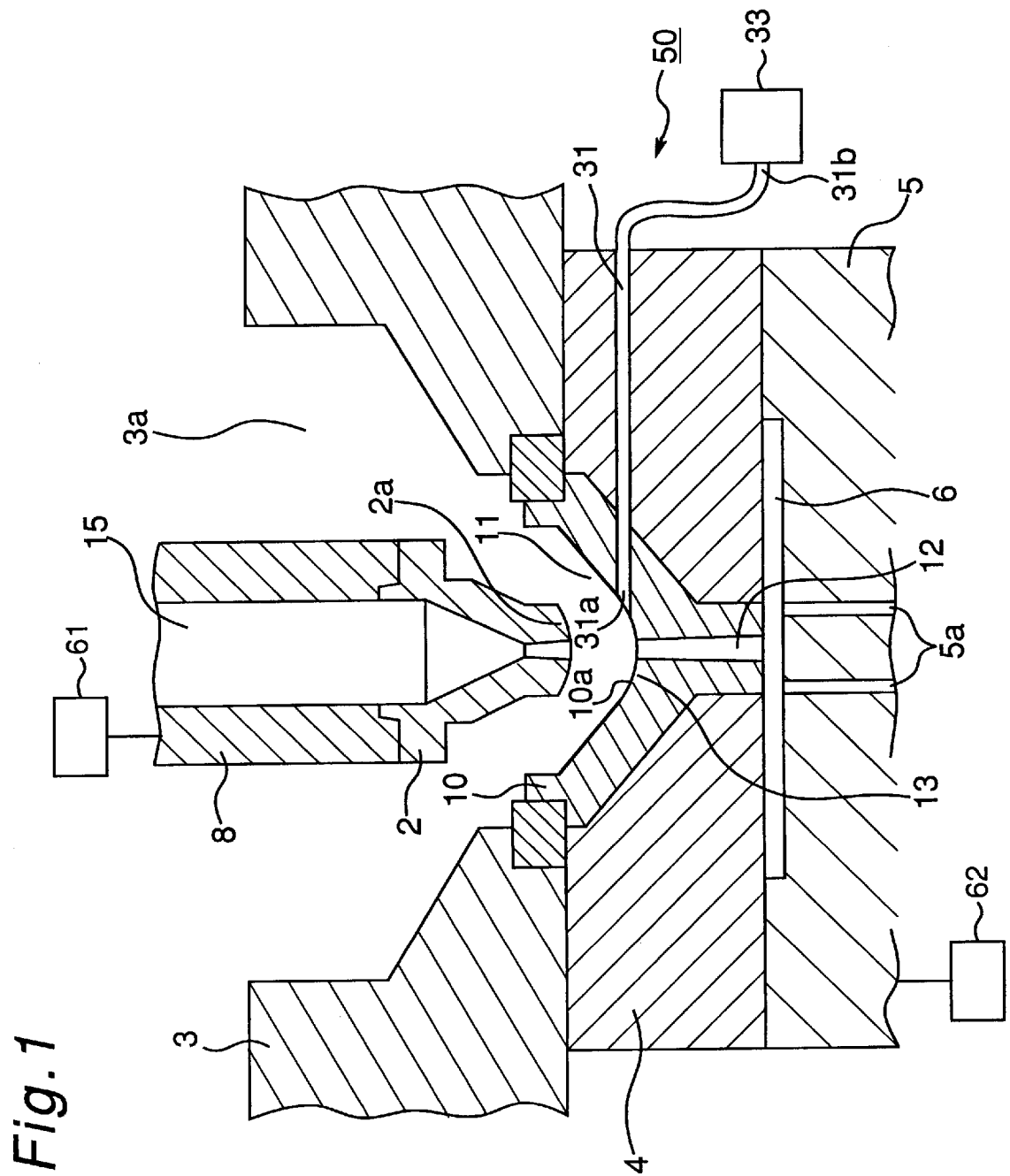
FIG. 1 is a sectional view showing the structure of a molding apparatus according to a first embodiment of the present invention.

A molding apparatus and a molding method of preferred embodiments of the present invention will be described hereinbelow with reference to the drawings throughout which like parts or parts functioning the same way are designated by like reference numerals. The molding method is executed by the molding apparatus.

First Embodiment

Figure 5:
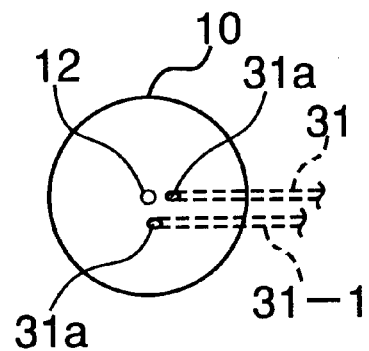
FIG. 5 is a plan view of a sprue bush indicating an arrangement of a suction path in the molding apparatus of FIG. 1.
Figure 10:
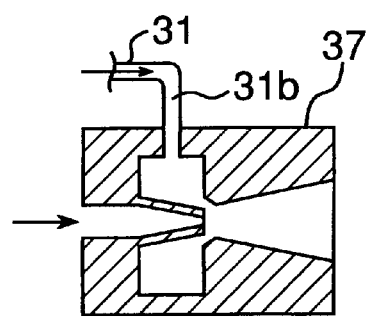
FIG. 10 is a diagram exemplifying the structure of a suction device.
Figure 12:
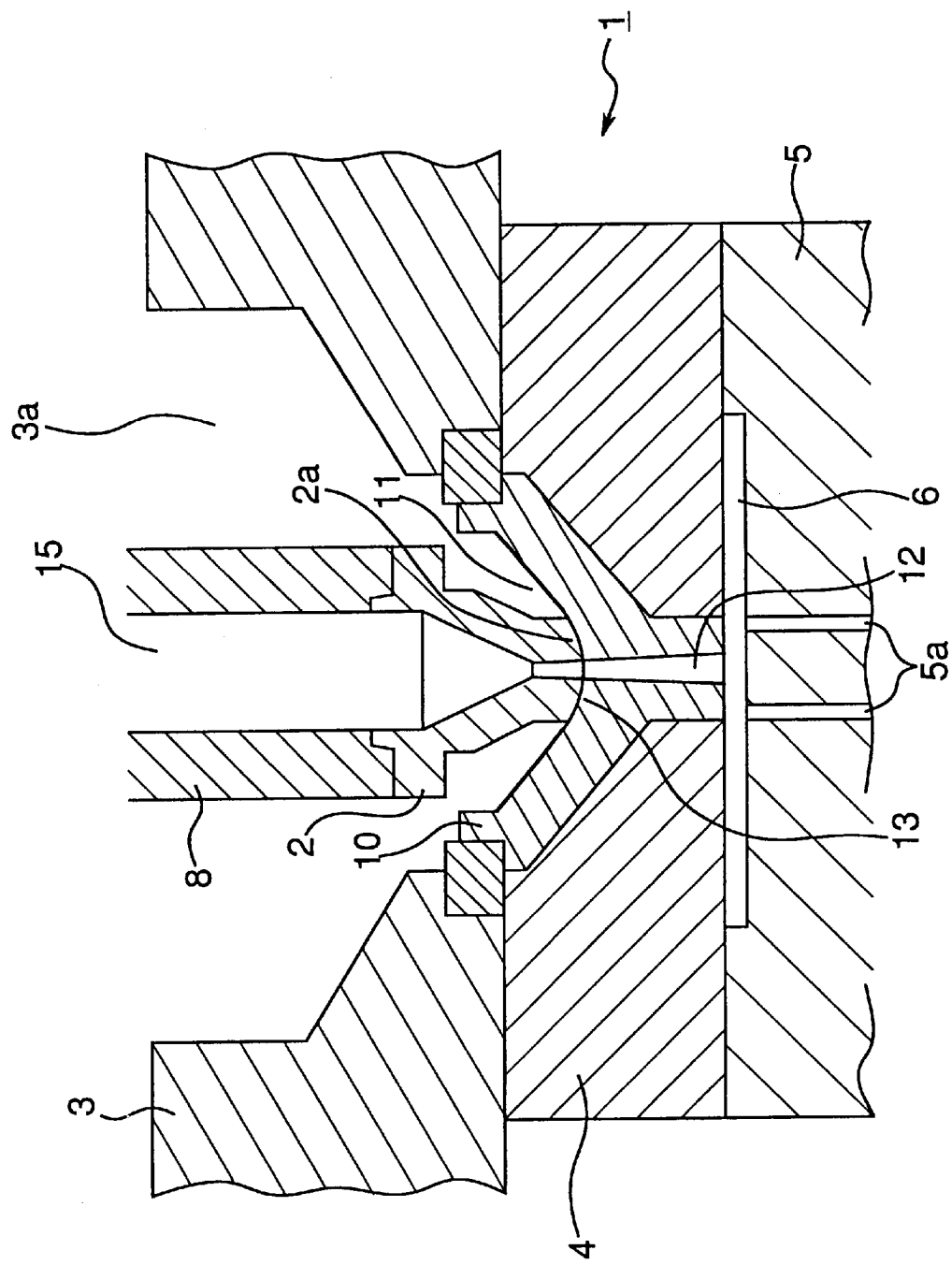
FIG. 12 is a sectional view of the structure of a conventional molding apparatus.

According to a first embodiment, as shown in FIG. 1, a suction path 31 is provided at a bottom part 13 of a sprue bush 10 having a mortar-like recessed part 11 formed in a circular shape in a plan view and includes a contact face 10a which is an area where a front end part 2a of a nozzle 2 comes in touch with the sprue bush 10. One end 31a of the suction path 31 is opened to the bottom part 13 of the sprue bush 10 and the other end 31b is connected to a suction device 33. The apparatus except the above suction path 31 comprises the same structure as the conventional molding apparatus 1 shown in FIG. 12. As indicated in FIG. 5, the suction path 31 has an inner diameter of approximately 10 mm and extends so as to penetrate the sprue bush 10 and a mold, for example metal mold 4 in a diametrical direction of the sprue bush 10. The suction device 33 sucks a gas through the driving of a motor, similar to a domestic vacuum cleaner, for example, with a suction efficiency generating a negative pressure of almost the same magnite as that product by the domestic vacuum cleaner at a suction flow rate of 2–3 l/min. An ejector 37, such as that shown in FIG. 10 which uses the cooling water supplied to the metal molds 4, 5, may be utilized as the suction device 33. When the cooling water is used, a sucked foreign substance is taken into the cooling water and is not gushed outside along with the discharge of the gas. A clean environment is thus realized without adding new facilities and the suction device 33 can be installed more inexpensively.

One suction path 31 is provided in the embodiment. However, the number of suction paths is not limited to one.

The operation of the molding apparatus 50 constituted as above will be described below. The molten resin is injected into the space 6 via the nozzle 2, thereby forming a molded body in the molding apparatus 50, as in the conventional molding apparatus described earlier. However, at least during a period after the molding, specifically when the cylinder 8 descends in an up-down direction and carbonized resin possibly drops as a foreign substance, the suction device 33 is driven to suck the foreign substance via the suction path 31. On the other hand, when the cylinder 8 descends so that the front end part 2a of the nozzle 2 is held in contact with the bottom part 13 of the sprue bush 10, the foreign substance never enters the space 6 and therefore, the above sucking operation is stopped during this period. In particular, referring to FIG. 4, the suction device 33 starts to suck at least the foreign substance present at the contact face 10a of the bottom part 13 of the sprue bush 10 in step S1 and the suction is stopped in step S2 when the nozzle 2 contacts the bottom part 13 of the sprue bush 10. In the following step S3, the molten resin is injected to the space 6 via the nozzle 2, thereby, forming the molded body. After the suction is resumed in step S4, the cylinder 8 is raised to remove the molded body from the metal mold 5. The molded body is finally taken out of the metal mold 5 in step S6. Then, purging of the interior of the nozzle 2 or the like preparation is carried out for the next molding operation. The apparatus is subsequently returned to step S1. The suction of the foreign substance is continued during the above preparation. The resumption of the suction in step S4 may be conducted after the cylinder 8 is raised in step S5.

At least the foreign substance falling onto the contact face 10a of the sprue bush 10 is sucked by the suction device 33 via the suction path 31, and is thereby prevented from entering the space 6. The first embodiment of the present invention hence provides the inexpensive molding apparatus and molding method whereby the quality and the yield of products, i.e., molded bodies are improved.

As denoted by a suction path 31-1 in FIG. 5, one end 31a of the suction path 31-1 may be opened at a slightly eccentric position in the diametrical direction of the sprue bush 10 within the contact face 10a. When the one end 31a of the suction path 31-1 is arranged as above, the sucked gas assumes a spiral locus along an inner face of the mortar-shaped recessed part 11 of the sprue bush 10. At this time, the foreign substance such as the earlier-mentioned carbide or the like moves along the outer circumference of the spiral because of its larger specific gravity than that of the air, and is easily guided into the suction path 31-1. Consequently, only clean gas is left in the vicinity of the opening of the sprue part 12 of the sprue bush 10. The foreign substance is more effectively guided to the suction path 31-1 and is thus prevented from invading the space 6.

Second Embodiment

Figure 2:
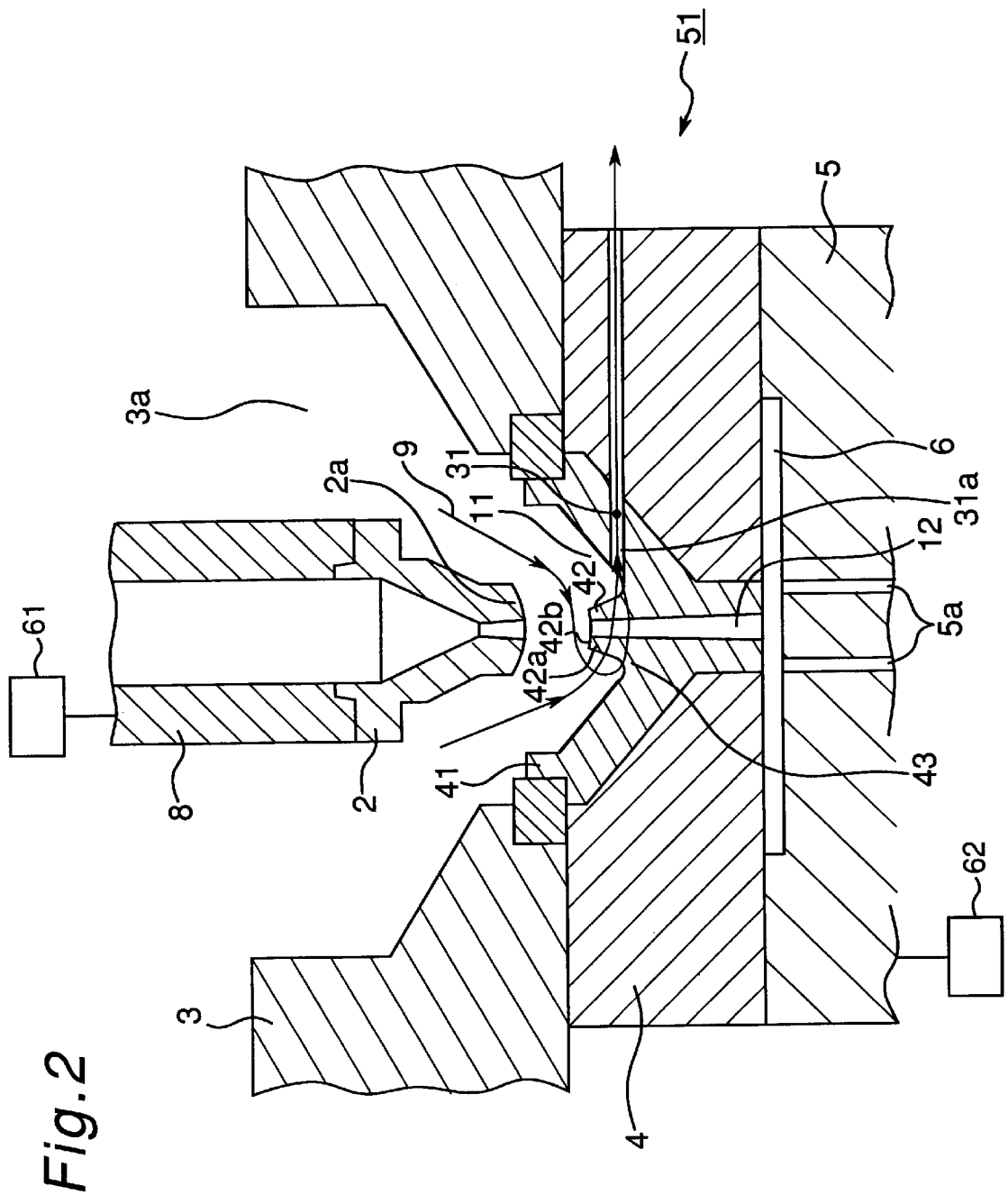
FIG. 2 is a sectional view showing the structure of a molding apparatus according to a second embodiment of the present invention.
Figure 3:
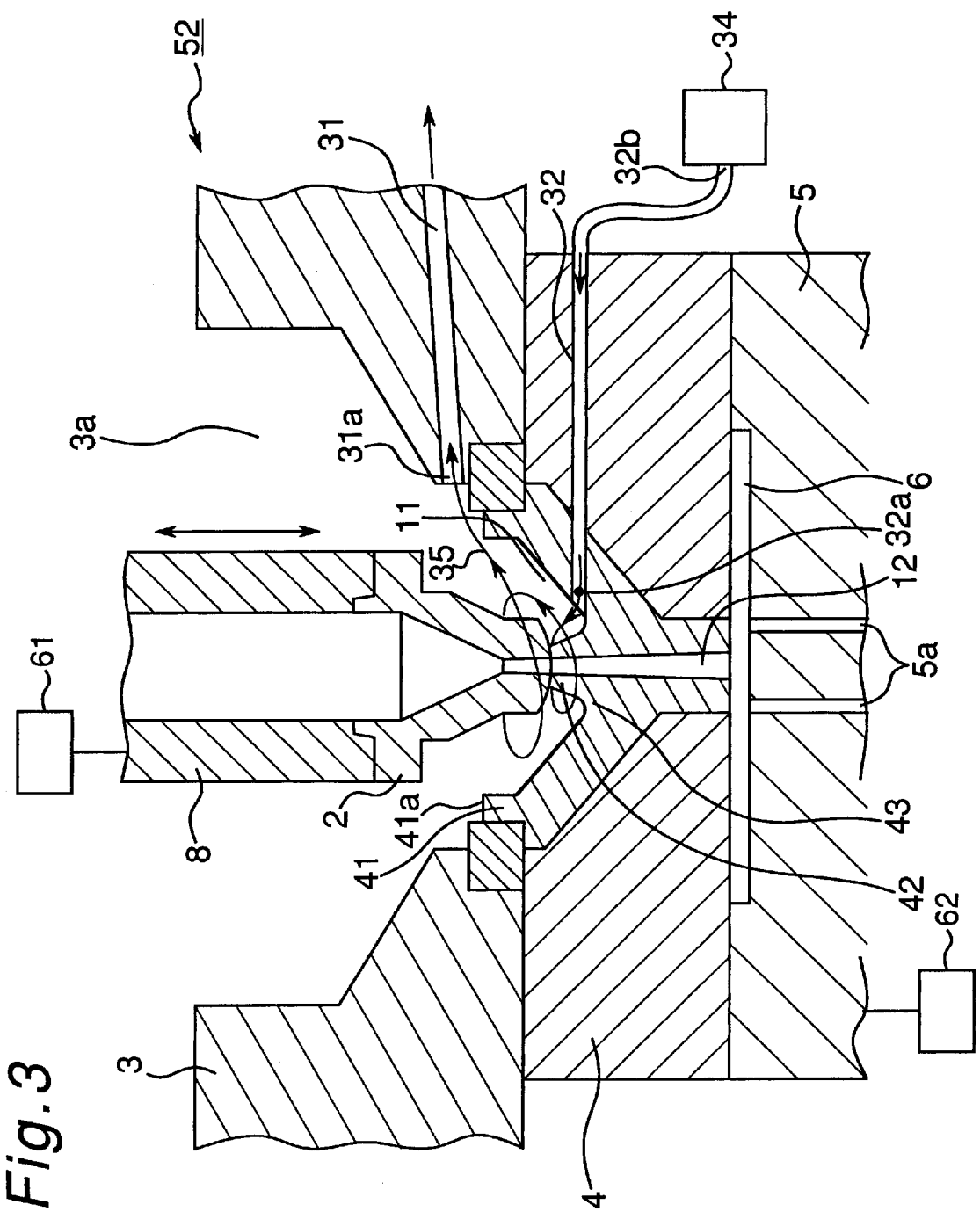
FIG. 3 is a sectional view showing the structure of a molding apparatus according to a third embodiment of the present invention.

A molding apparatus 51 according to a second embodiment of the present invention is provided with a sprue bush 41 which has a projecting part 42. A part of the bottom part 13 of the sprue bush 10 in touch with the front end part 2a of the nozzle 2 is projected towards the nozzle 2 as shown in FIG. 2, thereby constituting the projecting part 42. The construction of the apparatus 51, excluding the above part 42, is not different from that of the molding apparatus 50 of the first embodiment. At a top 42a of the projecting part 42, an area of a contact face 42b in touch with the front end part 2a of the nozzle 2 is made smaller than a surface area of the front end part 2a of the nozzle 2, thereby effectively reducing the foreign substance which can fall onto the contact face 42b from the front end part 2a of the nozzle 2. One end 31a of the suction path 31 opens at a root part 43 of the projecting part 42 at the bottom part of the sprue bush 41 where the projecting part 42 starts to rise.

The probability of the foreign substance invading the sprue part 12 is decreased due to the presence of the projecting part 42. In addition, the falling foreign substance is caught at the root part 43. The invasion of the foreign substance in the space 6 is furthermore prevented in the apparatus 51 than in the molding apparatus 50 of the first embodiment. Thus, the molded bodies which are obtained, are improved in quality and yield. Since the projecting part 42 is provided and one end 31a of the suction path 31 is opened at the root part 43 of the projecting part 42, the gas sucked to the suction path 31 flows tracing the outline of the projecting part 42, as represented by an arrow 9. The flow of the gas in the recessed part 11 of the sprue bush 41 becomes more complicated and thus whirls up the foreign substance, in comparison with the molding apparatus 50 of the first embodiment. So, the foreign substance is cleaned out more effectively.

Figure 6:
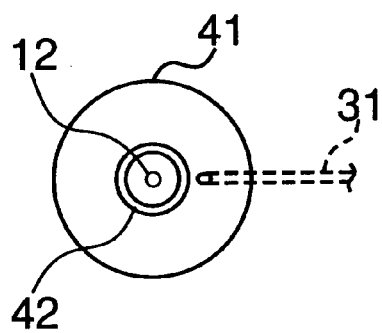
FIG. 6 is a plan view of a sprue bush indicating an arrangement of a suction path in the molding apparatus of FIG. 2.
Figure 7:
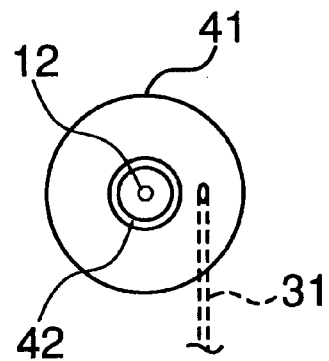
FIG. 7 is a plan view showing another example of an arrangement for the suction path in FIG. 6.

The suction path 31 may be formed so as to extend in the diametrical direction of the sprue bush 41 as indicated in FIG. 6, and one end 31a of the suction path 31 may be opened at a slightly eccentric position of the root part 43 in the diametrical direction of the sprue bush 43 as in FIG. 7. In the above constitution, the sucked gas flows spirally, and thus effectively sucks the foreign substance into the suction path 31.

The molding apparatus 51 of the second embodiment operates in the same manner as the molding apparatus 50, and therefore the description thereof will be omitted here.

Third Embodiment

Figure 8:
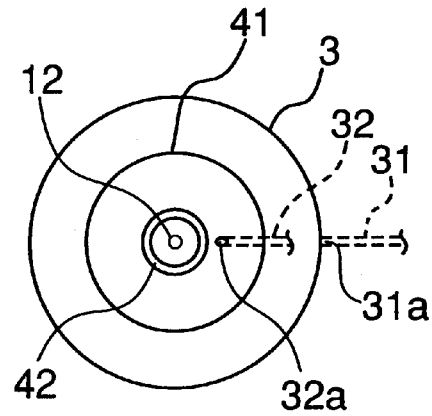
FIG. 8 is a plan view of a sprue bush and a metal mold indicating an arrangement of a suction path and a gas feeding path in the molding apparatus of FIG. 3.
Figure 9:
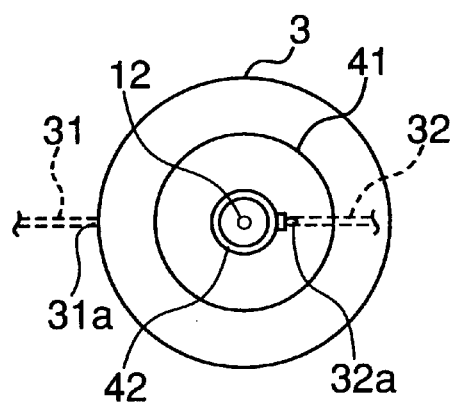
FIG. 9 is a plan view showing another example of arrangement for the suction path and the gas feeding path in FIG. 8.

In a molding apparatus 52 according to a third embodiment, a gas feeding path 32 is added to the molding apparatus 51 of the second embodiment in order to supply a flow of gas to the recessed part 11 of the sprue bush 41. The gas feeding path 32 has one end 32a open at the root part 43 of the sprue bush 41 and the other end 32b connected to a gas feeding device 34. The gas feeding path 32 penetrates the sprue bush 41 and the metal mold 4. On the other hand, the suction path 31 passes through the fixed plate 3 and has one end 31a opened at a lower part of the recessed part 3a of the fixed plate 3 in the vicinity of an upper face 41a of the sprue bush 41. The suction path 31 and the gas feeding path 32 are aligned at the same position of the up-down direction along the diametrical direction of the sprue bush 41, as illustrated in FIG. 8. Alternatively, both paths 31, 32 can be arranged in the diametrical direction of the sprue bush 41 and separated 180° in a circumferential direction of the sprue bush 41 and fixed plate 3. Moreover, respective one ends 31a, 32a of the suction path 31 and the gas feeding path 32 may open at a slightly eccentric position in the diametrical direction of the sprue bush 41.

If highly-accurate temperature control for the cylinder 8 including the nozzle 2 is not essential special feed part such as gas feeding path 32 can be eliminated. In this case, the gas may be sent to the recessed part 11 of the sprue bush 41, for instance, from above the fixed plate 3.

Figure 4:
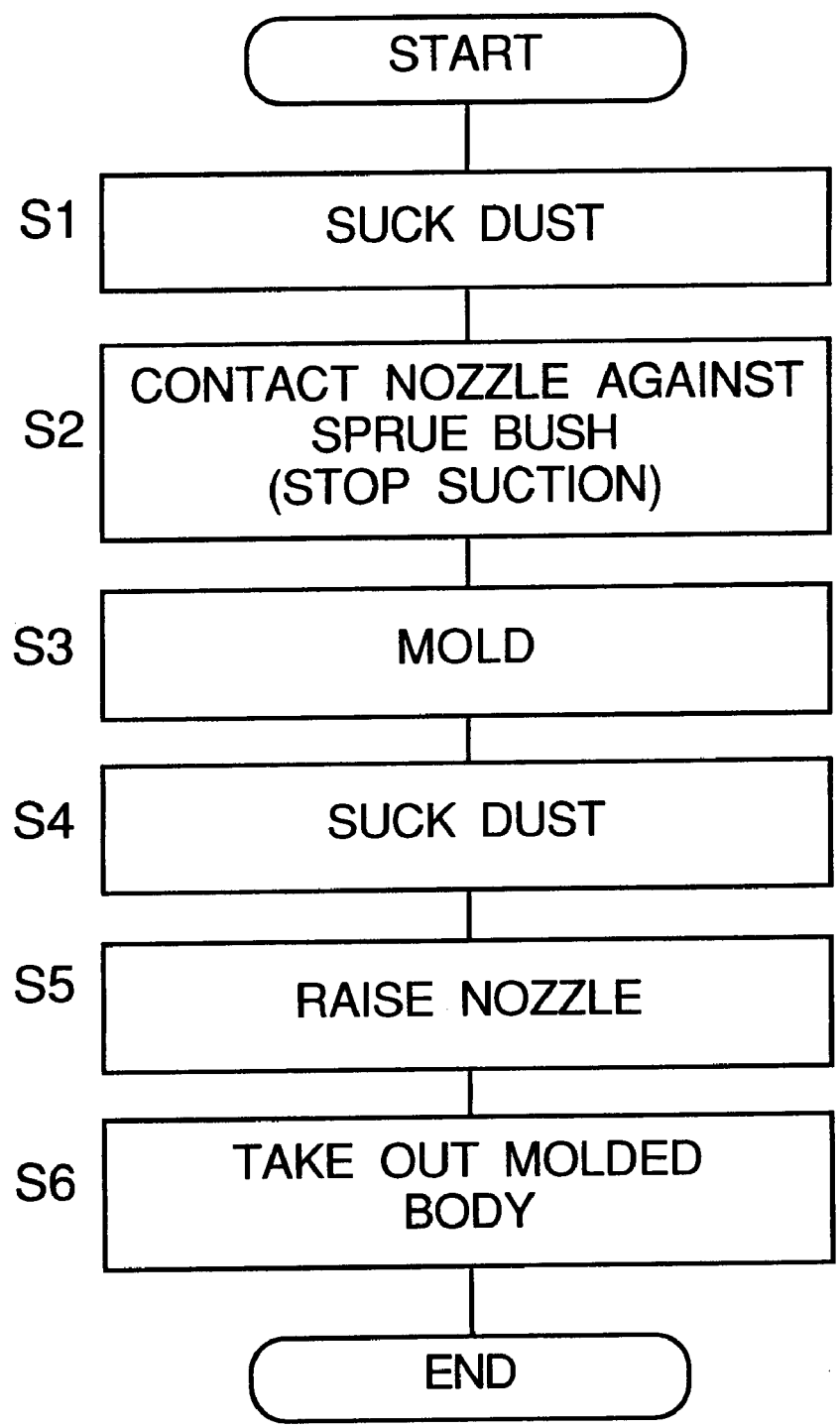
FIG. 4 is a flow chart of a series of operations in a molding method carried out in the molding apparatus of FIGS. 1–3.

The operation of the molding apparatus 52 of the above constitution is fundamentally the same as that of the molding apparatus 50 described with reference to FIG. 4. In the molding apparatus 52, the gas is supplied to the recessed part 11 of the sprue bush 41 from the gas feeding path 32 while the foreign substance is sucked in steps S1, S4.

In the molding apparatus 52, the gas is sucked in the suction path 31 while being sprayed to at least the contact face 42b of the projecting part 42 in touch with the front end part 2a of the nozzle 2 and also to the vicinity of the contact face 42b. Therefore, the contact face 42b and the vicinity are kept in a clean state. The gas does not stagnate in the recessed part 11 of the sprue bush 41. The foreign substance is thus more efficiently sucked. At the same time, the foreign substance adhering to the cylinder 8 or nozzle 2 is prevented from baking because of the spraying of the gas. The projecting part 42 causes turning or swirling of the sucked gas about the periphery of the projecting part 42 and then the sucked gas is guided to the suction path 31. The foreign substance follows the flow of the gas and therefore can be discharged outside of the sprue bush 41 even when the substance is inclined to move to the sprue part 12 of the sprue bush 41.

Figure 11:
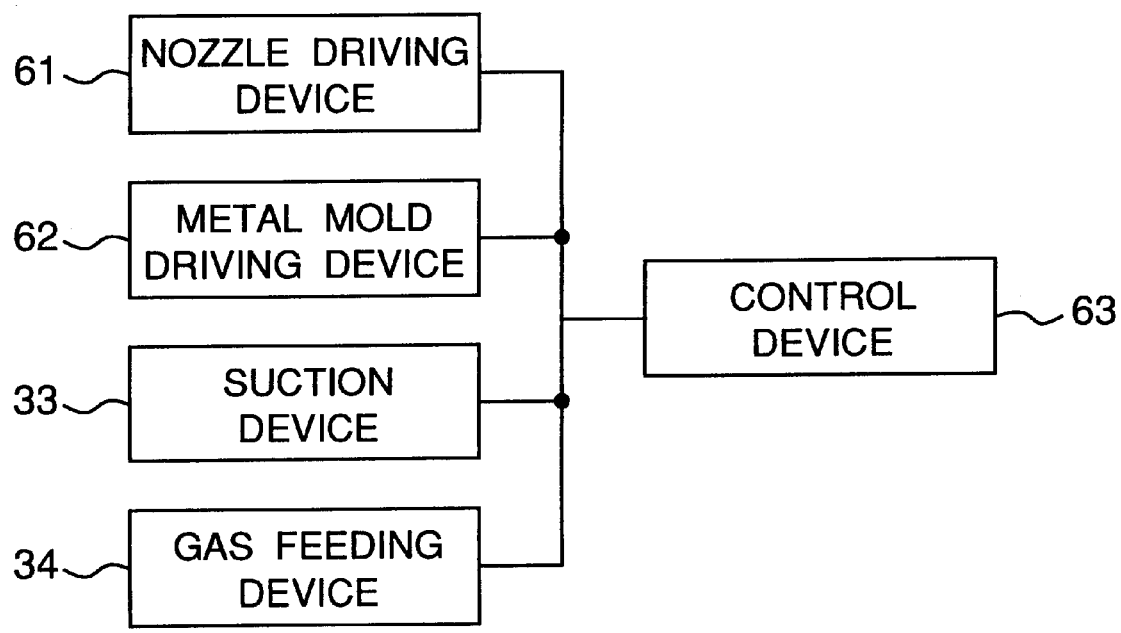
FIG. 11 is a block diagram schematically showing the constitution of the molding apparatus according to the embodiments of the present invention.

In the molding apparatus of the third embodiment as well as in the molding apparatuses of the first and second embodiments, the nozzle 2 is moved up/down by a nozzle driving device 61 and the metal mold 5 is opened/closed by a metal mold driving device 62. Each operation of the nozzle driving device 61, metal mold driving device 62, suction device 33 and gas feeding device 34 is controlled by a control device 63 as shown in FIG. 11 to execute the operations in the each embodiment.

As described in detail hereinabove, according to the molding apparatus in one aspect of the present invention and the molding method in the second aspect of the present invention, the gas at the contact face of the sprue bush in touch with the front end part of the nozzle and the vicinity of the contact face is suctioned. Accordingly the foreign substance which falls so as to invade the sprue part of the sprue bush is removed with the sucked gas. Thus, the foreign substance is prevented from being mixed in the molded product and the product quality and yield are improved.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A method of molding light-permeable articles in a molding apparatus which includes a mold defining a molding space for receiving injected resin material, a nozzle for injecting the resin material into the molding space, said nozzle being movable toward and away in a direction of gravity with respect to said mold, a sprue bush disposed between said nozzle and said mold, said sprue bush having a sprue part which guides resin material from said nozzle to said mold space, said method comprising:
    moving the nozzle downwardly into contact with a contact face of the sprue bush so that an injection hole of the nozzle communicates with the sprue part of the sprue bush;
    injecting the resin material from the nozzle into the molding space of the mold to thereby form a molded body;
    removing the molded body from the mold;
    retracting the nozzle from the sprue bush; and
    sucking a gas and a foreign substance at least at the contact face of the sprue bush before the nozzle moves into contact with the sprue bush.

2. A method of molding light-permeable articles as claimed in claim 1, further comprising delivering a flow gas to at least the contact face of the sprue bush below the level at which an intake opening of a suction path is disposed for performing the sucking operation.

3. A method of molding light-permeable articles as claimed in claim 2, further comprising generating a negative pressure in the suction path for said sucking operation by employing a flow of cooling water sent to the mold.

4. A molding apparatus for light-permeable articles, said apparatus comprising:
    a mold for forming a molded body, said mold defining a molding space;
    a nozzle for injecting a resin material into the molding space, said nozzle being movable toward and away from said mold;
    a sprue bush disposed between said nozzle and said mold, said sprue bush having a sprue part which guides resin material injected from said nozzle to said molding space,
    wherein a front end portion of said nozzle contacts said sprue bush at a contact area following movement of said nozzle toward said mold, and when said nozzle moves away from said mold, said nozzle moves out of contact with the contact area of said sprue bush so that foreign substances are able to invade the molding space; and a suction device for sucking the foreign substances at least at the contact area before said nozzle comes into contact with said sprue bush, said suction device having an intake opening.

5. A molding apparatus as claimed in claim 4, wherein said suction device comprises a suction path extending through said sprue bush, the suction path having a first end defining the intake opening at the contact face or in the vicinity of the contact face, and a second end in communication with a device for creating a negative pressure in the suction path.

6. A molding apparatus as claimed in claim 5, wherein said device for creating the negative pressure in the suction path employs a flow of cooling water, sent to said mold, for generating the negative pressure.

7. A molding apparatus as claimed in claim 4, further comprising a gas feeding device for delivering the gas to at least the contact face of the sprue bush.

8. A molding apparatus as claimed in claim 5, further comprising a gas feeding device for delivering the gas to at least the contact face of the sprue bush.

9. A molding apparatus as claimed in claim 6, further comprising a gas feeding device for delivering the gas to at least the contact face of the sprue bush.

10. A molding apparatus as claimed in claim 7, wherein said gas feeding device comprises a gas feed path extending through said sprue bush, said gas feed path having a first end which opens at the contact face or in the vicinity of the contact face, and a second end in communication with a device for delivering a flow of the gas to the sprue bush via said gas feed path, wherein the first end of said gas feed path is disposed below the intake opening of said suction device.

11. A molding apparatus as claimed in claim 8, wherein said gas feeding device comprises a gas feed path extending through said sprue bush, said gas feed path having a first end which opens at the contact face or in the vicinity of the contact face, and a second end in communication with a device for delivering a flow of the gas to the sprue bush via said gas feed path, wherein the first end of said gas feed path is disposed below the first end of said suction device.

12. A molding apparatus as claimed in claim 9, wherein said gas feeding device comprises a gas feed path extending through said sprue bush, said gas feed path having a first end which opens at the contact face or in the vicinity of the contact face, and a second end in communication with a device for delivering a flow of the gas to the sprue bush via said gas feed path, wherein the first end of said gas feed path is disposed below the first end of said suction device.

13. A molding apparatus as claimed in claim 4, wherein said sprue bush has an upper concave surface and includes a projecting part which projects from a bottom of the concave surface in a direction toward the front end portion of said nozzle, and an upper face of the projecting part defines the contact face of said sprue bush.

14. A molding apparatus as claimed in claim 5, wherein said sprue bush has an upper concave surface and includes a projecting part which projects from a bottom of the concave surface in a direction toward the front end portion of said nozzle, and an upper face of the projecting part defines the contact face of said sprue bush.

15. A molding apparatus as claimed in claim 7, wherein said sprue bush has an upper concave surface and includes a projecting part which projects from a bottom of the concave surface in a direction toward the front end portion of said nozzle, and an upper face of the projecting part defines the contact face of said sprue bush.

16. A molding apparatus as claimed in claim 8, wherein said sprue bush has an upper concave surface and includes a projecting part which projects from a bottom of the concave surface in a direction toward the front end portion of said nozzle, and an upper face of the projecting part defines the contact face of said sprue bush.

17. A molding apparatus as claimed in claim 10, wherein said sprue bush has an upper concave surface and includes a projecting part which projects from a bottom of the concave surface in a direction toward the front end portion of said nozzle, and an upper face of the projecting part defines the contact face of said sprue bush.

18. A molding apparatus as claimed in claim 11, wherein said sprue bush has an upper concave surface and includes a projecting part which projects from a bottom of the concave surface in a direction toward the front end portion of said nozzle, and an upper face of the projecting part defines the contact face of said sprue bush.

19. A molding apparatus as claimed in claim 12, wherein said sprue bush has an upper concave surface and includes a projecting part which projects from a bottom of the concave surface in a direction toward the front end portion of said nozzle, and an upper face of the projecting part defines the contact face of said sprue bush.

20. A molding apparatus as claimed in claim 19, wherein an area of the contact face of the projecting part is smaller than an area of the front end portion of said nozzle.

* * * * *